(12) United States Patent
Agapiou et al.

(10) Patent No.: US 11,545,880 B2
(45) Date of Patent: Jan. 3, 2023

(54) SEGMENTED STATOR LAMINATIONS

(71) Applicant: GM GLOBAL TECHNOLOGY OPERATIONS LLC, Detroit, MI (US)

(72) Inventors: John S. Agapiou, Rochester Hills, MI (US); James G. Schroth, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 14 days.

(21) Appl. No.: 17/077,318

(22) Filed: Oct. 22, 2020

(65) Prior Publication Data

US 2022/0131450 A1   Apr. 28, 2022

(51) Int. Cl.
*H02K 15/02*     (2006.01)
*H02K 1/14*      (2006.01)

(52) U.S. Cl.
CPC .......... *H02K 15/022* (2013.01); *H02K 1/148* (2013.01); *Y10T 29/53143* (2015.01)

(58) Field of Classification Search
CPC ............ H02K 1/148; H02K 1/16; H02K 1/02; H02K 1/185; Y10T 29/49009; Y10T 29/5317; B29L 2031/749
USPC ......... 29/732, 596, 598, 605, 606, 729, 738, 29/820
See application file for complete search history.

(56) References Cited

U.S. PATENT DOCUMENTS

| | | | |
|---|---|---|---|
| 7,701,107 B2 * | 4/2010 | Sagara ................... | H02K 1/148 310/216.099 |
| 7,960,889 B2 * | 6/2011 | Yamamoto ............. | H02K 1/148 310/216.057 |
| 8,487,502 B2 | 7/2013 | Kaiser et al. | |
| 10,749,416 B2 * | 8/2020 | Aoki ....................... | C21D 8/12 |
| 2013/0000455 A1 | 1/2013 | Kaiser et al. | |

\* cited by examiner

*Primary Examiner* — Thiem D Phan
(74) *Attorney, Agent, or Firm* — Lorenz & Kopf LLP

(57) ABSTRACT

Stator cores and methods for fabricating stator cores are provided. An exemplary stator core includes a stack of laminations. Each lamination in the stack of laminations comprises a yoke and a plurality of tooth segments fixed to the yoke.

13 Claims, 4 Drawing Sheets

SEGMENTED STATOR LAMINATIONS

INTRODUCTION

The technical field generally relates to electric machines, and more particularly relates to stators for electric machines.

An electric motor uses electric potential energy to produce mechanical energy through the interaction of magnetic fields and current-carrying conductors. The reverse process, using mechanical energy to produce electrical energy, is accomplished by a generator or dynamo. Other electric machines, such as motor/generators, combine various features of both motors and generators.

Electric machines may include an element rotatable about a central axis. The rotatable element, which may be referred to as a rotor, may be coaxial with a static element, which may be referred to as a stator. The electric machine uses relative rotation between the rotor and stator to produce mechanical energy or electrical energy.

Typically, the stator is made from hundreds of laminations. Use of stator laminations rather than a single unitary stator provides a number of advantages including the reduction of eddy current. Specifically, the electromagnetic field of a stator core generates a voltage, called an eddy current, that may result in power loss and diminished performance. Stator laminations reduce eddy current by insulating the stator core. Specifically, thin silicon steel plates that are stacked on top of one another around the center prevent eddy current flow. Further, the use of laminations cools the stator core. A solid unitary stator core would heat up with the eddy current. Therefore, reduction of the eddy current also prevents overheating of the stator core. Also, the use of laminations reduces hysteresis loss. Specifically, lamination plates have narrow hysteresis loops, requiring less energy to magnetize and demagnetize the core, thereby making the motor more efficient.

While the use of laminations in stators provides several benefits, the production of laminations can be wasteful and may not provide for optimized performance. It would be desirable to develop methods of fabricating stator cores that reduces material waste and provides for improved electrical performance. Also, it would be desirable to provide stator cores with improved electrical performance. Furthermore, other desirable features and characteristics of embodiments herein will become apparent from the subsequent detailed description and the appended claims, taken in conjunction with the accompanying drawings and the foregoing technical field and background.

SUMMARY

In an exemplary embodiment, a stator core is provided and includes a stack of laminations. Each lamination in the stack of laminations comprises a yoke and a plurality of tooth segments fixed to the yoke.

In exemplary embodiments of the stator core, each lamination in the stack of laminations is centered about a central axis, each tooth segment in the plurality of tooth segments comprises grain oriented electrical steel (GOES) material, and each tooth segment in the plurality of tooth segments has a tooth grain orientation in a radial direction from the central axis. In further exemplary embodiments, the yoke in each lamination in the stack of laminations comprises yoke segments, each yoke segment comprises GOES material, and each yoke segment has a yoke grain orientation perpendicular to the radial direction from the central axis. In further embodiments, the yoke in each lamination in the stack of laminations comprises yoke segments, and each yoke segment comprises non grain oriented electrical steel (NGOES). In further embodiments, the yoke in each lamination in the stack of laminations is non-segmented and comprises non grain oriented electrical steel (NGOES).

In exemplary embodiments of the stator core, each tooth segment in the plurality of tooth segments is fixed to a respective yoke by an interlock structure selected from at least a first interlock structure and a second interlock structure different from the first interlock structure. In further embodiments, the stack of laminations includes a middle lamination having a middle yoke, an upper lamination over and contacting the middle lamination and having an upper yoke, and a lower lamination under and contacting the middle lamination and having a lower yoke; the plurality of tooth segments includes middle tooth segments fixed to the middle yoke, lower tooth segments fixed to the lower yoke, and upper tooth segments fixed to the upper yoke; a selected middle tooth segment fixed to the middle lamination by a selected first interlock structure is located under a selected upper tooth segment and over a selected lower tooth segment; and neither the selected upper tooth segment nor the selected lower tooth segment is fixed to the upper lamination or the lower lamination, respectively, by the first interlock structure. In further embodiments, the stack of laminations includes a middle lamination having a middle yoke, an upper lamination over and contacting the middle lamination and having an upper yoke, and a lower lamination under and contacting the middle lamination and having a lower yoke; the plurality of tooth segments includes middle tooth segments fixed to the middle yoke, lower tooth segments fixed to the lower yoke, and upper tooth segments fixed to the upper yoke; and interlock structures in adjacent laminations are staggered such that a selected middle tooth segment fixed to the middle yoke by a first interlock structure does not lie directly under an upper tooth segment fixed to the upper yoke by a first interlock structure and does not lie directly over a lower tooth segment fixed to the lower yoke by a first interlock structure.

In exemplary embodiments of the stator core, the yoke in each lamination in the stack of laminations comprises yoke segments; each pair of adjacent yoke segments is interconnected at a yoke interface; the stack of laminations includes a middle lamination, an upper lamination over and contacting the middle lamination, and a lower lamination under and contacting the middle lamination; and yoke interfaces in adjacent laminations are staggered such that a selected yoke interface in the middle lamination does not lie directly under any yoke interface in the upper lamination and does not lie directly over any yoke interface in the lower lamination.

In another exemplary embodiment, a stator core is provided and includes a middle lamination; an upper lamination over and contacting the middle lamination; and a lower lamination under and contacting the middle lamination. Each lamination comprises yoke segments, and within each lamination each adjacent pair of yoke segments is interlocked at a yoke interface. Further, yoke interfaces in adjacent laminations are staggered such that a selected yoke interface in the middle lamination does not lie directly under a yoke interface in the upper lamination and does not lie directly over a yoke interface in the lower lamination. In an exemplary embodiment of the stator core, each yoke segment comprises non grain oriented electrical steel (NGOES).

In yet another exemplary embodiment, a method for fabricating a stator core is provided. The method includes aligning an expandable arbor within an expandable sleeve, and adjusting an outer edge of the expandable arbor to a desired inner diameter for the stator core. Further, the method includes forming a lower lamination between the expandable arbor and expandable sleeve, forming a middle lamination between the expandable arbor and expandable sleeve, and forming an upper lamination between the expandable arbor and expandable sleeve. Also, the method includes contracting an inner edge of the expandable sleeve to a desired outer diameter for the stator core, and connecting the lower lamination, the middle lamination and the upper lamination to one another to form the stator core.

Exemplary embodiments of the method further include punching yokes and tooth segments from sheets of material. In such embodiments, forming the lower lamination, forming the middle lamination, and forming the upper lamination comprise interconnecting the yokes and the tooth segments.

Exemplary embodiments of the method further include punching yoke segments and tooth segments from sheets of material. In such embodiments, forming the lower lamination, forming the middle lamination, and forming the upper lamination comprise interconnecting the yoke segments and the tooth segments.

Exemplary embodiments of the method further include punching yoke segments including teeth from sheets of material. In such embodiments, forming the lower lamination between the expandable arbor and expandable sleeve comprises positioning lower yoke segments between the expandable arbor and expandable sleeve and interconnecting the lower yoke segments to form the lower lamination, forming the middle lamination between the expandable arbor and expandable sleeve comprises positioning middle yoke segments between the expandable arbor and expandable sleeve and interconnecting the middle yoke segments to form the middle lamination, and forming the upper lamination between the expandable arbor and expandable sleeve comprises positioning upper yoke segments between the expandable arbor and expandable sleeve and interconnecting the upper yoke segments to form the upper lamination. Further exemplary embodiments include contracting and removing the expandable arbor after forming the stator core.

In exemplary embodiments of the method, lower yoke segments are interconnected at lower yoke interfaces, middle yoke segments are interconnected at middle yoke interfaces, and upper yoke segments are interconnected at upper yoke interfaces, and positioning the lower yoke segments, positioning the middle yoke segments, and positioning the upper yoke segments comprises staggering the middle yoke interfaces from the lower yoke interfaces and the upper yoke interfaces.

Exemplary embodiments of the method include punching tooth segments and the lower, middle and upper yoke segments from sheets of material, and interconnecting the tooth segments and the lower, middle and upper yoke segments before positioning the lower, middle and upper yoke segments between the expandable arbor and expandable sleeve.

In exemplary embodiments of the method, punching the tooth segments comprises forming the tooth segments from grain oriented electrical steel (GOES) material. In such embodiments, after forming the stator core, each yoke segment has a yoke grain orientation perpendicular to the radial direction from a central axis of the stator core.

In exemplary embodiments, interconnecting the tooth segments and the lower, middle and upper yoke segments comprises interconnecting the tooth segments and the lower, middle and upper yoke segments with interlock structures selected from at least a first interlock structure and a second interlock structure. In such embodiments, positioning the lower, middle and upper yoke segments comprises staggering the interlock structures such that a selected first interlock structure in the middle lamination is not located directly over a first interlock structure in the lower lamination and is not located directly under a first interlock structure in the upper lamination.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising." In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated. As used herein, the "%" or "percent" described in the present disclosure refers to the weight percentage unless otherwise indicated. Further, terms such as "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

Embodiments herein are related to motor, specifically stator, design. Certain embodiments provide for portions of the stator to be fabricated separately from other portions of the stator before being assembled and connected together. Specifically, tooth segments and yoke segments may be fabricated separately, such as by punching or stamping from sheets of material. As a result, each segment may be optimized for stator magnetic flux and for creating minimum material scrap, particularly of expensive material, from the stamping process. The segmentation design of the laminations and the selection of the material for the segmented sections of the lamination may enhance the magnetic flux and/or manufacturing process depending on the application.

Figure 1:
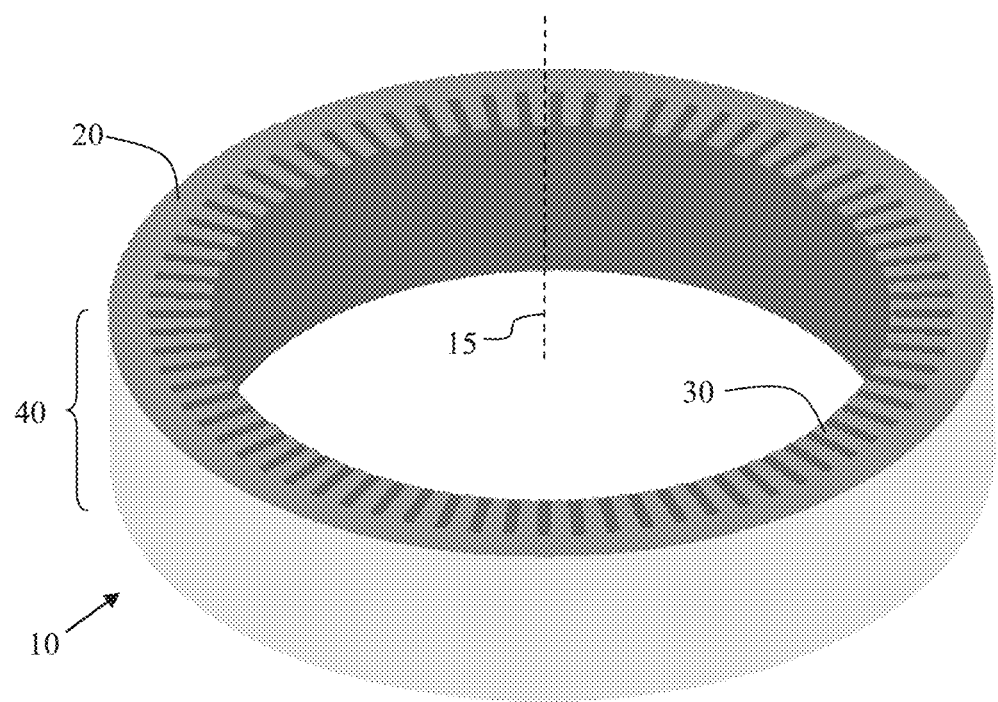
FIG. 1 is an isometric view of a stator core in accordance with an embodiment.

Referring to the drawings, wherein like reference numbers correspond to like or similar components whenever possible throughout the several figures, there is shown in FIG. 1 an isometric view of a stator core 10. Features and components shown in other figures may be incorporated and used with those shown in FIG. 1.

The stator core 10 is shown partially assembled in FIG. 1, and may be used to construct a stator (not shown). The stator core 10 may be one component of an electric machine (not shown), such as an electric motor, generator, or motor/generator. The stator core 10 may be configured to interface with a housing or support (not shown) of an electric machine into which the stator core 10 is incorporated, or with a transmission housing (not shown) when the stator core 10 is part of a transmission or hybrid transmission (not shown).

As shown in FIG. 1, the stator core 10 defines a central axis 15. Further, the stator core 10 has an annular yoke 20 and teeth 30 located on the interior side of the annular yoke and extending toward the central axis 15, such that the stator core 10 will cooperate with an interior rotor (not shown). However, the elements and components described herein and illustrated with respect to the stator core 10 may also be used to construct an electric machine having an exterior rotor and interior stator, such that the stator teeth 30 may be located on the exterior of the yoke 20 and extend outwardly from the yoke 20. In either case, the stator teeth 30 may be used to support and align stator windings (not shown) in winding slots formed between the stator teeth 30. The stator windings are conductive wires or cables through which current may flow during operation of the electric machine.

Figure 2:
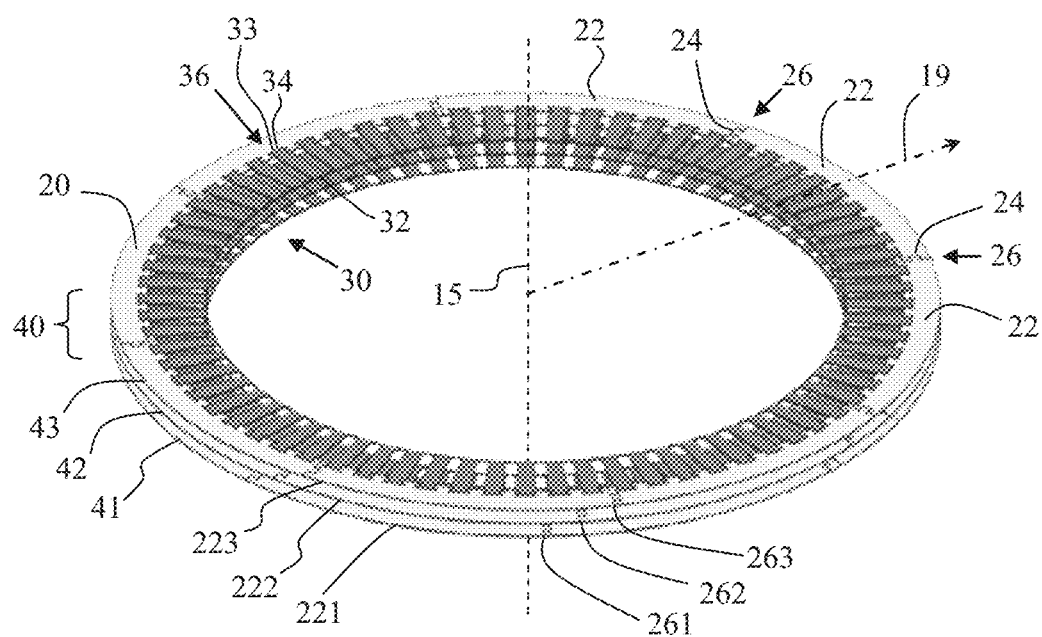
FIG. 2 is an isometric view of three laminations for use in a stator core in accordance with an embodiment.
Figure 3:
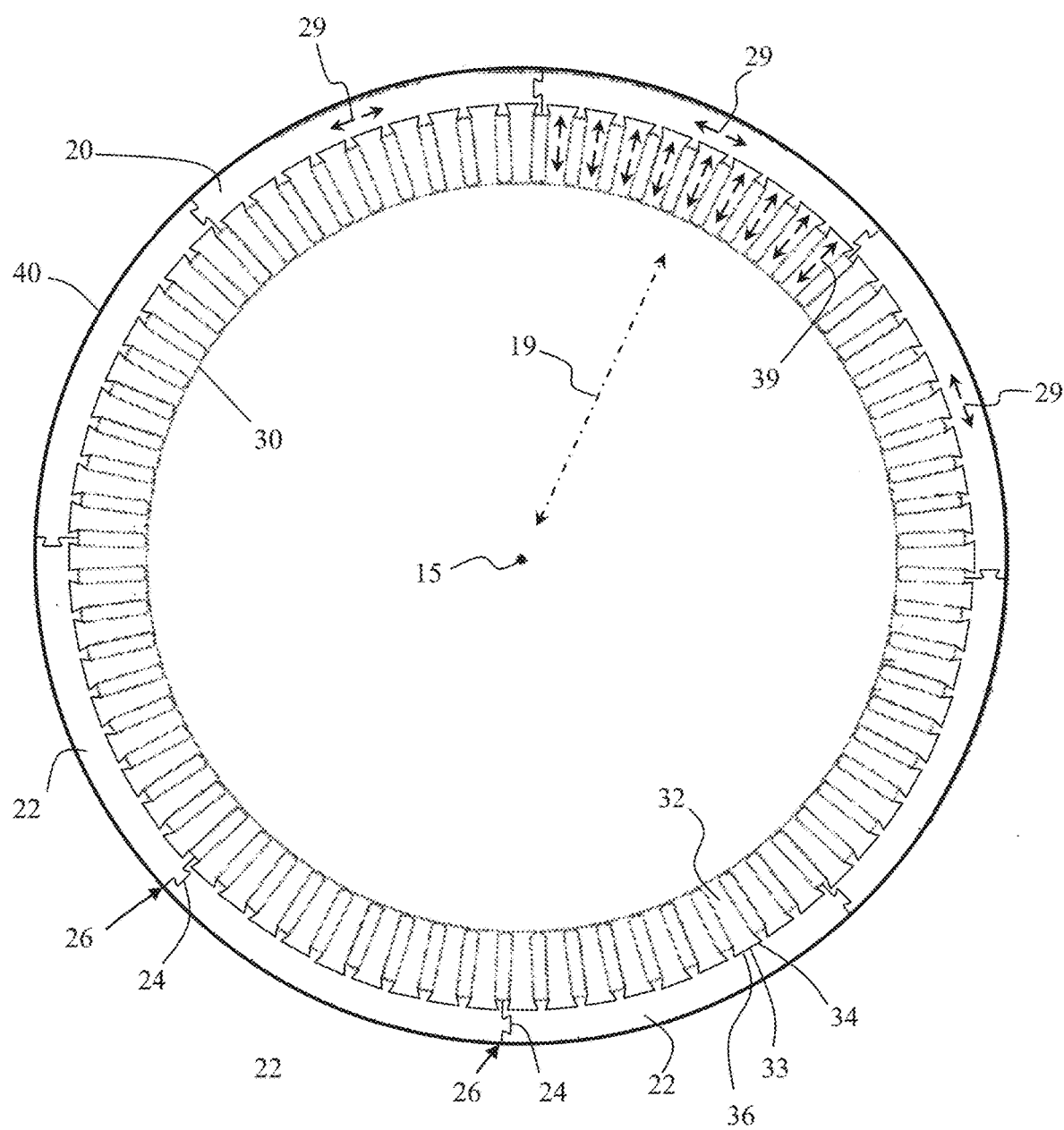
FIG. 3 is a top view of a lamination from FIG. 1.

The stator core 10 comprises a plurality of layers or laminations 40. In certain embodiments, the stator core 10 may include a hundred laminations or more. FIG. 2 illustrates for reasons of clarity only three laminations 40 that may be used in a stator core 10, i.e., a lower lamination 41, a middle lamination 42, and an upper lamination 43. FIG. 3 provides a top view of a single lamination 40 from FIG. 2.

Embodiments herein provide for laminations 40 that include a non-segmented unitary yoke 20, such as a yoke 20 that is punched from a sheet of material in one piece, or a yoke 20 that comprises segmented yoke segments that are fabricated separately and connected or fixed together. Further, embodiments herein provide for laminations 40 including teeth 30 comprising a plurality of tooth segments that are fabricated separately from, and connected or fixed to, the yoke 20 (or yoke segments), or that are fabricated with and integral with the yoke 20 (or yoke segments), such as teeth 30 that are punched from a sheet of material in one piece with a unitary yoke or with a yoke segment.

In the illustrated embodiment of the laminations 40 in FIGS. 2-3, for each lamination 40, the yoke 20 is segmented and includes yoke segments 22. Each yoke segment 22 includes a connection feature 24 at each end, such that each pair of adjacent yoke segments is interconnected or fixed to one another at a yoke interface 26 therebetween. For example, each yoke segment 22 may have a male connection feature 24 at one end and a reciprocal female connection feature 24 at an opposite end. In an exemplary embodiment, the connection features 24 are universal such that any pair of yoke segments 22 may be interconnected at a yoke interface 26 therebetween.

In the illustrated embodiment, the connection features 24 comprise a dovetail structure. The central portion of the each dovetail connection feature 24 extends perpendicular to the radial direction 19 of the central axis 15, i.e., in a tangential direction relative to the central axis 15. The dovetail size may be designed as a function of the yoke width (back iron) and the core assembly stress requirements for the motor. While a sixty degree dovetail is contemplated, any suitable included angle may be used and can be reduced as necessary as a function of the yoke width. In an exemplary embodiment, the opening of the dovetail may be about 25% of the yoke width (12 mm) and may be located about 40% of the yoke width from the outside radius of the yoke segment. For example, a dovetail opening for the segment may be 3 mm and may be located 5 mm from the outer diameter of the yoke segment. The dovetail may be designed with a selected radius at the four corners for the male and female sections of the features 24 to reduce stresses and improve the assembly automation.

As illustrated, exemplary laminations 40 comprise a plurality of yoke segments 22. The yoke segments 22 cooperate to define the laminations 40 as individual layers of the stator core 10 of FIG. 1. In the embodiments of FIGS. 2-3, the yoke 20 of each lamination 40 includes eight yoke segments 22 such that each yoke segment 22 comprises forty-five degrees of the annular yoke 20; however, it may be desirable to utilize fewer or more yoke segments 22 in the yoke 20 of each lamination 40, such as from one to seventy-two segments or more depending on the stator diameter and the number of teeth around the stator. For example, the stator illustrated in FIGS. 1-3 has seventy-two teeth and in an exemplary case, the number of yoke segments may be two, three, four, six, eight, nine, twelve, eighteen, twenty-four, thirty-six, or seventy-two and the corresponding teeth per segment will be thirty-two, twenty-four, eighteen, twelve, nine, eight, six, four, three, two or one so that the product of the number of yoke segments and the number of teeth per yoke segment is equal to seventy-two. This indicates that a larger diameter stator can be split into more yoke segments assuming the number of teeth increases with diameter. In an exemplary embodiment, each lamination 40 in the stator core includes a same amount of yoke segments 22; however, it is contemplated that laminations 40 in a stator core 10 may be provided with different numbers of yoke segments 22.

Cross-referencing FIGS. 1 and 2, it may be seen that the stator core 10 may include laminations 40 that are arranged or stacked in alternating layers. The laminations 40 are aligned about the central axis 15, and are rotated relative to each other about the central axis 15 such that each lamination 40 is offset relative to the respective adjacent or adjoining laminations 40. With this alignment and offset, a bricklayer type pattern results.

Figure 5:
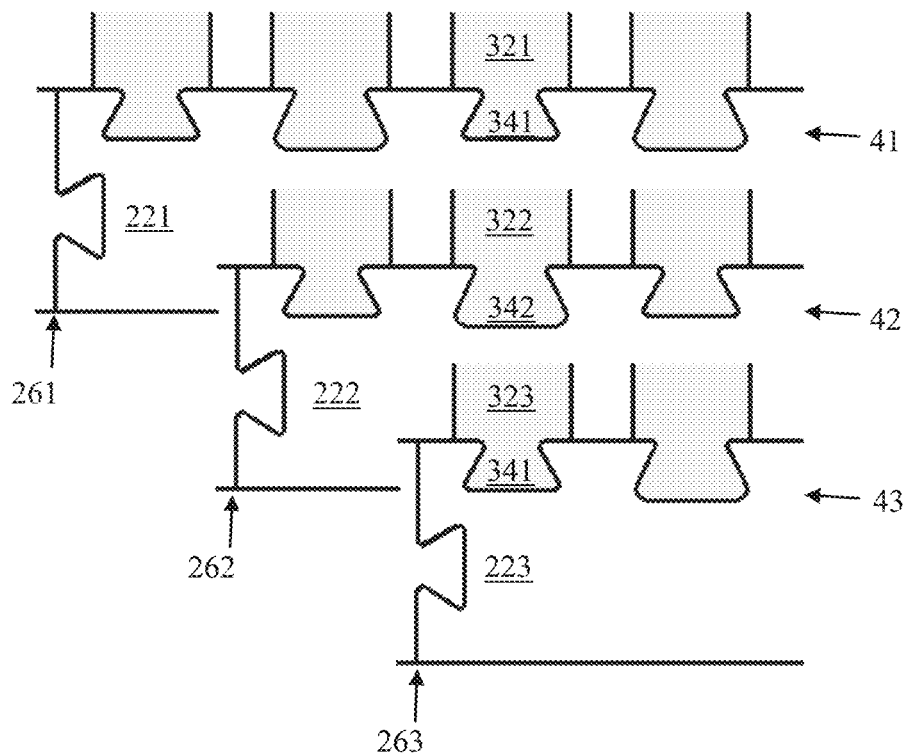
FIG. 5 is an exploded top isometric view of a portion of the three laminations of FIG. 2.

In FIG. 2, each lamination 40, i.e., lower lamination 41, middle lamination 42, and upper lamination 43, is rotated about the central axis 15 at a selected angle relative to each other. While illustrated as being five degrees, the angle of rotation between adjacent laminations 40 may be any suitable angle and the minimum rotation is determined by the angle of a single tooth. As shown, each lamination 40 is offset relative to the respective adjacent laminations 40 by the selected angle such that the yoke interfaces 26, i.e., joints between yoke segments 22 are not aligned, i.e., are not located directly over or under one another. When viewed from the side or an isometric view the yoke interfaces 26 between yoke segments 22 are staggered from lamination 41 or 42 to adjacent lamination 42 or 43. This is indicated clearly in FIG. 2 and in FIG. 5, which provides an exploded top isometric view of a portion of the three laminations 41, 42 and 43 of FIG. 2. In FIGS. 2 and 5, yoke segments 22 are identified in the lower lamination 41 as lower yoke segments 221 and are connected at lower yoke interfaces 261, yoke segments 22 are identified in the middle lamination 42 as middle yoke segments 222 and are connected at middle yoke interfaces 262, and yoke segments 22 are identified in the upper lamination 43 as upper yoke segments 223 and are connected at upper yoke interfaces 263. As shown, the middle yoke interfaces 262 are not aligned with the lower yoke interfaces 261 or the upper yoke interfaces 263. Further, the lower yoke interfaces 261 are not aligned with the upper yoke interfaces 263. As a result, no connection feature 24 in a lamination 40, such as middle lamination 42, is aligned with, i.e., located directly over or under (in the perspective illustrated), a connection feature 24 in the adjacent laminations 40, such as laminations 41 and 43.

In FIG. 5, the yoke interfaces of the lower, middle, and upper laminations are illustrated as being staggered by rotating each lamination by the distance of about the width of one tooth segment. However, adjacent laminations may be rotated relative to one another by any desired distance, such as distances of about the width of two, three, four, five, or other desired number of tooth segments.

Referring back to FIGS. 2-3, for each lamination 40, the teeth 30 are a plurality of tooth segments 32. In FIGS. 2-3, nine tooth segments 32 are connected to each yoke segment 22. However, any suitable number of teeth per segment may be determined as a function of the stator inside diameter, the yoke width (back iron), and the lamination material (grain oriented electrical steel (GOES) or non-grain oriented electrical steel (NGOES) as described below).

Stator tooth design may be based on the motor optimization characteristics, such that an optimum number of tooth segments or teeth 30 per yoke segment 22 can be estimated based on the percentage flux loss.

In an exemplary embodiment, each tooth segment 32 is I-shaped, with a narrow midsection and wider ends. As shown, each tooth segment 32 has a proximal end 33 that includes an interlock structure 34 provided for connecting or fixing the tooth segment 32 to the yoke 20, resulting in a tooth interface 36 therebetween. At the proximal end 33, each tooth segment 32 includes an interlock structure 34 or a portion of an interlock structure 34. The interlock structure 34 of each tooth segment 32 is provided to connect or fix the tooth segment 32 to the yoke 20.

Figure 4:
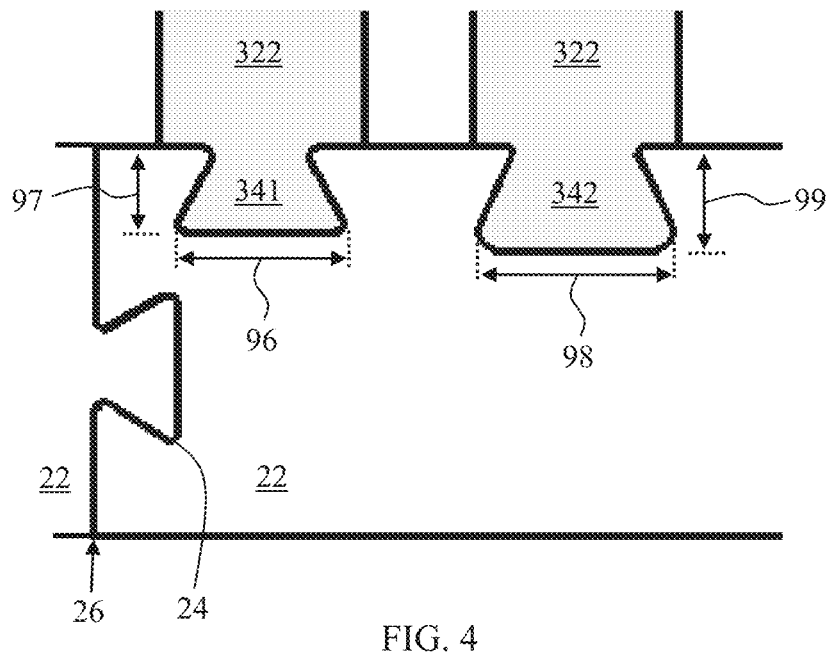
FIG. 4 is an exploded top isometric view showing the interconnection between a yoke segment and tooth segments of FIG. 2.

Referring now to FIG. 4, it may be seen that embodiments herein provide for the use of at least two different interlock structures 34. Specifically, in FIG. 4, a first interlock structure 341 is provided to connect or fix a selected middle tooth segment 322 to the yoke segment 22 while a second interlock structure 342 is provided to connect or fix an adjacent middle tooth segment 322 to the yoke segment 22.

As shown, first interlock structure 341 has a first width indicated by arrow 96 and a first depth indicated by arrow 97, while second interlock structure 342 has a second width indicated by arrow 98 and a second depth indicated by arrow 99. While first interlock structure 341 and second interlock structure 342 share a common dovetail shape, second interlock structure 342 differs from first interlock structure 341 in size, such that second width 98 is greater than first width 96 and second depth 99 is greater than first depth 97. While first interlock structure 341 and second interlock structure 342 share a common shape in FIGS. 2-4, the interlock structures 341 and 342 may differ by having different shapes and common sizes, or by having different shapes and different sizes. Generally, the dovetail size is a function of the tooth segment width and lamination design. For example for an exemplary lamination including seventy-two tooth segments and having an internal diameter of about 240 mm, the larger interlock structure 342 may have a width 97 of about 5.5 mm. The dovetail opening width is determined by the tooth segment width and slot opening between tooth segments.

As shown in FIG. 5, in the middle lamination 42, a selected middle tooth segment 322 is fixed to the yoke 20 by a second interlock structure 342. In the lower lamination 41, a selected lower tooth segment 321, lying directly under the selected middle tooth segment 322, is fixed to the yoke 20 by a first interlock structure 341. In the upper lamination 43, a selected lower tooth segment 323, lying directly over the selected middle tooth segment 322, is fixed to the yoke 20 by a first interlock structure 341. Accordingly, in an exemplary embodiment, no first interlock structure 341 lies directly over or directly under, i.e., vertically adjacent to, another first interlock structure 341, and no second interlock structure 342 lies directly over or directly under, i.e., vertically adjacent to, another second interlock structure 342 when stacked in the stator core 10 of FIG. 1.

While only first and second interlock structures 341 and 342 are expressly illustrated in FIGS. 4 and 5, it is contemplated that more than two interlock structures 34 may be used in, and staggered throughout, the stator core 10 such that no selected interlock structure type lies directly over or directly under, i.e., vertically adjacent to, another same interlock structure type. For manufacturing simplicity, the upper lamination 41 may use only one structure 341 around the yoke, while the middle lamination 42 uses only the different structure 342 around the yoke, and the lower lamination 43 may use the same structure 341 as the upper lamination 41. This pattern may alternate among adjacent laminations so that two identical structures do not overlap.

Referring back to FIGS. 2 and 3, exemplary embodiments provide for the formation of tooth segments 32 from a selected material. For example, each tooth segment 32 may comprise or consist of grain oriented electrical steel (GOES) material. As shown in FIG. 3, when comprised of GOES material, each tooth segment 32 may be fabricated and assembled such to have a tooth grain orientation indicated by arrow 39 in a radial direction from the central axis 15, i.e., the direction of the grain orientation is along the length of the tooth segment 32. Such an orientation may provide for improved electrical performance. Specifically, the GOES material has better magnetic flux density in the direction of the grain orientation compared to NGOES material. Further, during design, the length of the tooth segments may be adjusted to optimize electrical performance. Tooth segments 32 may comprises or consist of NGOES material, for example when a higher flux density is not required and when reducing the scrap rate of the material is important to reduce the motor cost.

In certain embodiments, the yoke segments 22 may comprise or consist of GOES material and have a yoke grain orientation indicated by the arrows 29 perpendicular to the radial direction from the central axis 15. Such an orientation may provide for improved electrical performance. In other embodiments, the yoke segments comprise or consist of non grain oriented electrical steel (NGOES).

Thus, it is contemplated that a stator core 10 may be fabricated from laminations 40 having: tooth segments comprised of GOES material and yoke segments comprised of GOES material; tooth segments comprised of GOES material and yoke segments comprised of NGOES material; tooth segments comprised of NGOES material and yoke segments comprised of GOES material; or tooth segments comprised of NGOES material and yoke segments comprised of NGOES material. Generally, maximum performance of an electric machine comprising the stator core may be achieved by utilizing GOES material in either or both of the yoke and teeth such that the grain direction is in the same direction that flux is expected to flow.

Figure 6:
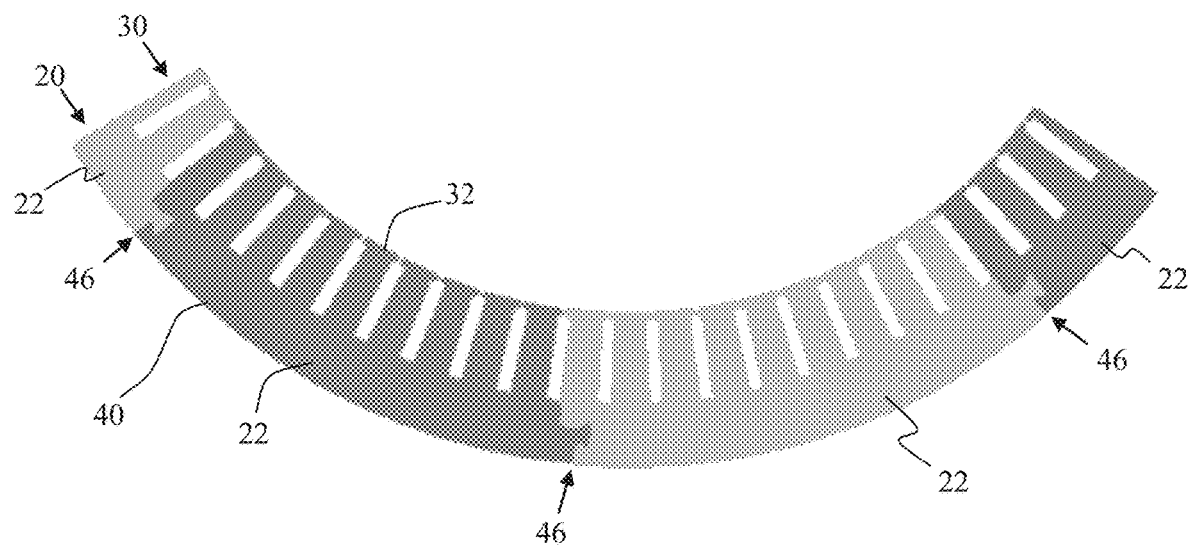
FIG. 6 is a top view of a portion of a lamination from the stator core of FIG. 1 in accordance with an embodiment.

Referring now to FIG. 6, a portion of a lamination 40 used in a stator core 10 is shown. Similar to the embodiment of FIG. 1, in FIG. 6, the lamination 40 is comprised of a yoke 20 comprising yoke segments 22, and the yoke segments 22 include integral teeth 30, i.e., tooth segments 32 are not segmented from the yoke segments 22, but are unitary with and included in the yoke segment 22 when fabricated, such as by stamping from a sheet of material. Such an embodiment may be desirable particularly when both the yoke segments 22 and teeth 30 may be comprised of NGOES material. The lamination 40 of FIG. 5 may be arranged as described above to provide staggered yoke interfaces 46 in the stator core.

In another embodiment, each yoke 20 may be a single-piece, unitary member. In other words, each yoke may be comprised of a single endless yoke segment 22. Such an embodiment may be desirable particularly when the yoke 20 or yoke segment 22 may be comprised of NGOES material and the tooth segments 32 connected thereto may be comprised of GOES material.

Figure 7:
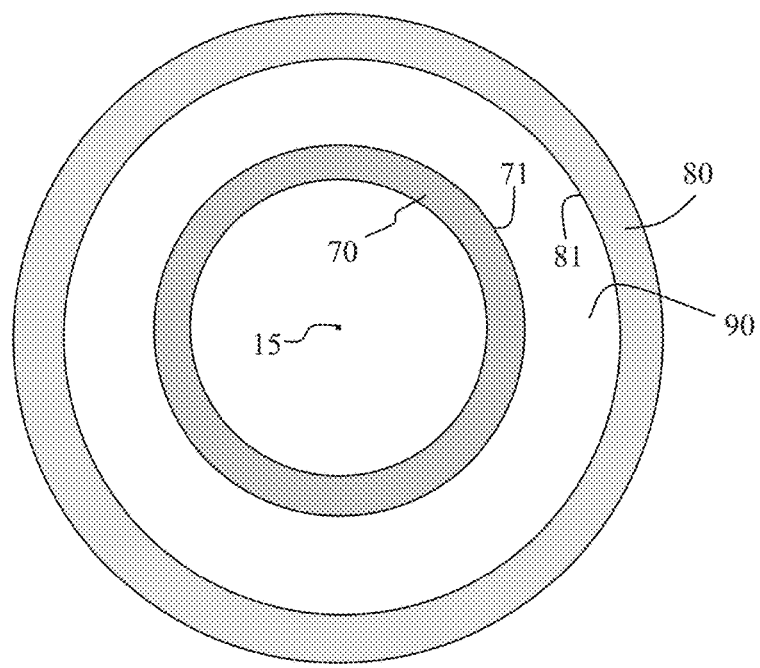
FIG. 7 is a schematic top view of an apparatus for fabricating a stator core in accordance with an embodiment.

Referring now to FIG. 7, a method for fabricating a stator core may include punching yoke segments with integral teeth or punching, separately, yokes or yoke segments and tooth segments from sheets of material. For embodiments with tooth segments, the method includes interconnecting the tooth segments and the yoke segments. The method may include bonding the tooth segments to the yoke. The fabrication method may include welding the stacked laminations at several locations around the outer diameter of the stack or by chemically bonding the individual laminations to one another. For either process, stacking the laminations may be performed with a special fixture to make sure the laminations are aligned properly in a perfect circle with minimum variation due to the tolerances at the wedge interlocks. Specifically, the method further includes aligning an expandable arbor 70 about central axis 15 and within an expandable sleeve 80 and adjusting an outer edge 71 of the arbor 70 to a desired inner diameter for the stator core. A bottom plastic dielectric ring plate (not shown) may be placed between the arbor 70 and sleeve 80 to support the laminations to be formed.

Thereafter, the method includes positioning lower yoke segments between the arbor 70 and sleeve 80 and interconnecting the lower yoke segments to form a lower lamination, positioning middle yoke segments between the arbor 70 and sleeve 80 and interconnecting the middle yoke segments to form a middle lamination; and positioning upper yoke segments between the arbor 70 and sleeve 80 and interconnecting the upper yoke segments to form an upper lamination. Positioning the yoke segments may comprise staggering the middle yoke interfaces from the lower yoke interfaces and the upper yoke interfaces as described above. Also, positioning the yoke segments may comprise staggering the interlock structures such that a selected first interlock structure in the middle lamination is not located directly over a first interlock structure in the lower lamination and is not located directly under a first interlock structure in the upper lamination as described above. As described above, the number of laminations formed between the arbor 70 and sleeve 80 may be one hundred or more.

The method may include positioning a top plastic dielectric ring plate 90 over the top of the uppermost lamination in the stack of laminations to control the stacking factor and hold the tooth segments to prevent any movement during the insertion of hairpins. After the laminations are assembled together to form the stator, the hairpins are inserted in the slots between the teeth. A hairpin has the shape of a Greek pi and one leg is inserted in one of the slots and the second leg in a different slot to form the wiring diagram. The hairpin's legs will fill-up the slots between the teeth. The current flowing through the hairpin generates the magnetic field around the stator.

After the laminations are positioned as desired, the method includes contracting an inner edge 81 of the expandable sleeve 80 to a desired outer diameter for the stator core. Further, the method includes connecting the stack of laminations to one another to form the stator core. For example, the method may include bonding the laminations together or welding the laminations together. After forming the stator core, the method may include retracting and removing the expandable arbor.

As described herein, embodiments provide for stator cores having improved electrical performance. Further, embodiments provide for improved methods for fabricating stator cores that may reduce material waste, and specifically reduce waste of expensive materials through the optimization of design and processing.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A stator core, comprising:
 a stack of laminations, wherein each lamination in the stack of laminations comprises a yoke and a plurality of tooth segments fixed to the yoke, wherein each lamination in the stack of laminations is centered about a central axis, wherein the yoke in each lamination in the stack of laminations comprises yoke segments, wherein each yoke segment comprises grain oriented electrical steel (GOES) material, and wherein each respective yoke segment has a yoke grain orientation perpendicular to a respective radial axis extending from the central axis and through the respective yoke segment.

2. The stator core of claim 1, wherein each tooth segment in the plurality of tooth segments comprises a single tooth, is individually fixed to the yoke, and is not in contact with adjacent tooth segments.

3. The stator core of claim 1, wherein each tooth segment in the plurality of tooth segments comprises non grain oriented electrical steel (NGOES) material.

4. The stator core of claim 1, wherein a first tooth segment in the plurality of tooth segments is fixed to a respective yoke by a first interlock structure and a second tooth segment in the plurality of tooth segments is fixed to the respective yoke by a second interlock structure, wherein the second interlock structure is larger than the first interlock structure.

5. The stator core of claim 1, wherein:
the stack of laminations includes a middle lamination having a middle yoke, an upper lamination over and contacting the middle lamination and having an upper yoke, and a lower lamination under and contacting the middle lamination and having a lower yoke;
the plurality of tooth segments includes middle tooth segments fixed to the middle yoke, lower tooth segments fixed to the lower yoke, and upper tooth segments fixed to the upper yoke;
a selected middle tooth segment fixed to the middle lamination by a middle interlock having a first interlock structure is located under a selected upper tooth segment and over a selected lower tooth segment;
the selected upper tooth segment is fixed to the upper lamination by an upper interlock not having the first interlock structure; and
the selected lower tooth segment is fixed to the lower lamination by a lower interlock not having the first interlock structure.

6. The stator core of claim 1, wherein:
the stack of laminations includes a middle lamination having a middle yoke, an upper lamination over and contacting the middle lamination and having an upper yoke, and a lower lamination under and contacting the middle lamination and having a lower yoke;
the plurality of tooth segments includes middle tooth segments fixed to the middle yoke by interlocks, lower tooth segments fixed to the lower yoke by interlocks, and upper tooth segments fixed to the upper yoke by interlocks; and
the interlocks in adjacent laminations are staggered such that a selected middle tooth segment fixed to the middle yoke by a selected interlock having a first interlock structure does not lie directly under an upper tooth segment fixed to the upper yoke by a respective interlock having the same first interlock structure and does not lie directly over a lower tooth segment fixed to the lower yoke by a respective interlock having the same first interlock structure.

7. The stator core of claim 1, wherein:
within each lamination, each pair of adjacent yoke segments is interconnected at a yoke interface;
the stack of laminations includes a middle lamination, an upper lamination over and contacting the middle lamination, and a lower lamination under and contacting the middle lamination; and
yoke interfaces in adjacent laminations are staggered such that a selected yoke interface in the middle lamination does not lie directly under any yoke interface in the upper lamination and does not lie directly over any yoke interface in the lower lamination.

8. A stator core, comprising:
a stack of laminations, wherein each lamination in the stack of laminations comprises a yoke and a plurality of tooth segments fixed to the yoke, wherein each lamination in the stack of laminations is centered about a central axis, wherein each tooth segment in the plurality of tooth segments comprises grain oriented electrical steel (GOES) material, and wherein each tooth segment in the plurality of tooth segments has a tooth grain orientation in a radial direction from the central axis, wherein the yoke in each lamination in the stack of laminations comprises yoke segments, wherein each yoke segment comprises GOES material, and wherein each yoke segment has a yoke grain orientation perpendicular to the radial direction from the central axis.

9. The stator core of claim 8, wherein each tooth segment in the plurality of tooth segments has a distal end and a proximal end, with the distal end being located between the central axis and the proximal end, and wherein the proximal end of each tooth segment in the plurality of tooth segments is fixed to the yoke.

10. The stator core of claim 8, wherein a first tooth segment in the plurality of tooth segments is fixed to a respective yoke by a first interlock structure and a second tooth segment in the plurality of tooth segments is fixed to the respective yoke by a second interlock structure, wherein the second interlock structure is larger than the first interlock structure.

11. The stator core of claim 8, wherein:
the stack of laminations includes a middle lamination having a middle yoke, an upper lamination over and contacting the middle lamination and having an upper yoke, and a lower lamination under and contacting the middle lamination and having a lower yoke;
the plurality of tooth segments includes middle tooth segments fixed to the middle yoke, lower tooth segments fixed to the lower yoke, and upper tooth segments fixed to the upper yoke;
a selected middle tooth segment fixed to the middle lamination by a middle interlock having a first interlock structure is located under a selected upper tooth segment and over a selected lower tooth segment;
the selected upper tooth segment is fixed to the upper lamination by an upper interlock not having the first interlock structure; and
the selected lower tooth segment is fixed to the lower lamination by a lower interlock not having the first interlock structure.

12. The stator core of claim 8, wherein:
the stack of laminations includes a middle lamination having a middle yoke, an upper lamination over and contacting the middle lamination and having an upper yoke, and a lower lamination under and contacting the middle lamination and having a lower yoke;
the plurality of tooth segments includes middle tooth segments fixed to the middle yoke by interlocks, lower tooth segments fixed to the lower yoke by interlocks, and upper tooth segments fixed to the upper yoke by interlocks; and
the interlocks in adjacent laminations are staggered such that a selected middle tooth segment fixed to the middle yoke by a selected interlock having a first interlock structure does not lie directly under an upper tooth segment fixed to the upper yoke by a respective interlock having the same first interlock structure and does not lie directly over a lower tooth segment fixed to the lower yoke by a respective interlock having the same first interlock structure.

13. The stator core of claim 8, wherein:

within each lamination, each pair of adjacent yoke segments is interconnected at a yoke interface;

the stack of laminations includes a middle lamination, an upper lamination over and contacting the middle lamination, and a lower lamination under and contacting the middle lamination; and yoke interfaces in adjacent laminations are staggered such that a selected yoke interface in the middle lamination does not lie directly under any yoke interface in the upper lamination and does not lie directly over any yoke interface in the lower lamination.

\* \* \* \* \*